Nov. 13, 1923.
J. S. REYNOLDS
PRESSURE REGULATOR
Filed April 26 1921
1,474,164.
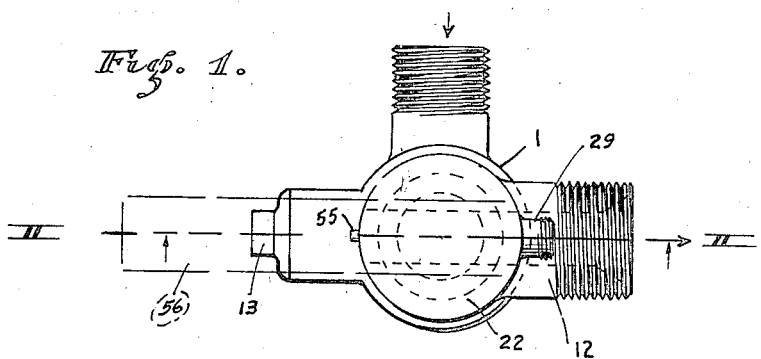
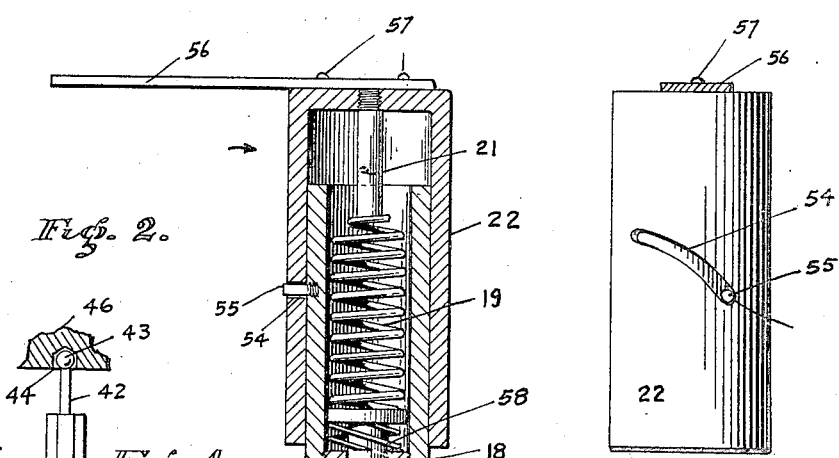
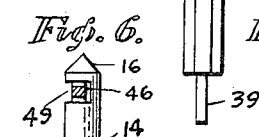
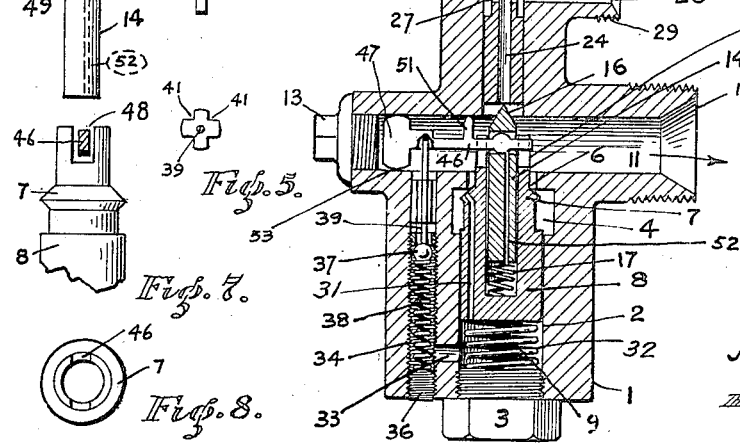
Inventor
Joy S. Reynolds
By Bradley L. Benson
Attorney.

Patented Nov. 13, 1923.

1,474,164

UNITED STATES PATENT OFFICE.

JOY S. REYNOLDS, OF SAN FRANCISCO, CALIFORNIA, ASSIGNOR OF ONE-HALF TO CHARLES A. BALCOM, OF SAN FRANCISCO, CALIFORNIA.

PRESSURE REGULATOR.

Application filed April 26, 1921. Serial No. 464,693.

*To all whom it may concern:*

Be it known that JOY S. REYNOLDS, a citizen of the United States of America, residing at 654 Clement Street, San Francisco, in the county of San Francisco and State of California, has invented certain new and useful Improvements in Pressure Regulators, of which the following is a specification.

The present invention is an improved automatic pressure regulator and relates particularly to that type of devices wherein liquid is used for actuating other mechanism at a varied range of pressure.

In the device hereinafter described it is possible to so govern the pressure of a liquid that, in an operation requiring any desired pressure of said liquid, the pressure may be instantly applied and thereafter maintained.

With a slight movement of the lever for manually controlling my device it is possible to instantly apply and maintain the force of the liquid at any desired pressure, or to partially or fully release pressure.

The primary object of the invention is to provide a device which will automatically maintain or automatically reduce liquid pressure, and which may be manually operated to deliver pressure in any desired degree.

In this specification and the annexed drawings, the invention is illustrated in the form considered to be the best, but it is to be understood that the invention is not limited to such form because it may be embodied in other forms, and it is also to be understood that in and by the claims following the description it is desired to cover the invention in whatever form it may be embodied.

In the accompanying one sheet of drawings, Fig. 1 is a top plan view of my regulator.

Fig. 2 is a vertical central section of same taken on the line II—II of Fig. 1 looking in the direction of the arrows.

Fig. 3 is an elevation of a sleeve showing a cam slot therein for compressing a spring.

Fig. 4 is an enlarged detail showing a push pin.

Fig. 5 is an end elevation of Fig. 4.

Fig. 6 is an elevation of a plunger, showing a slot therein for engaging a lever.

Fig. 7 is a fragmentary detail showing a valve, the cylindrical wall of which is slotted to engage a lever.

Fig. 8 is a top plan view of Fig. 7.

Referring to the drawings, the numeral 1 indicates in its entirety a casting provided with a bore 2 closed at one end by a plug 3 threaded therein.

The bore 2 communicates with an inlet passage 4 through which the liquid is introduced at initial pressure from any suitable source.

The bore 2 is reduced as shown at 6 to form a valve seat for a valve 7, which is a reduced portion of a piston 8 pressed upwardly by a spring 9, which bears at one end against said piston and at the opposite end against the plug 3.

The valve 7 controls the flow of liquid from intake passage 4 to a discharge passage 11 terminating in a boss 12 finished for a union connection with a service pipe not shown. This passage 11 extends through the casting 1 and is plugged at the end remote from the discharge by a plug 13 threaded therein.

The reduced upper end of the piston 8 carries a plunger 14 slidable therein and tapered at the outer end to form a needle valve as shown at 16. A spring 17 bears at one end against the piston 8 and at the other end against the plunger 14.

The purpose of spring 17 is to normally seat the needle valve 16 in the end of a plunger 18 slidable in a bore 20, the head of which may be pressed downwardly by one end of a spring 19 the opposite end of which bears against a pin 21 secured to a sleeve 22 slidably mounted on a sleeve 23 secured to the casting 1.

The plunger 18 is centrally bored as indicated at 24. This bore communicates with an annular groove 26 on said plunger by means of ports 27. As the plunger 18 has a limited vertical movement, the annular groove 26 is purposely widened to insure a register thereby with a port 28 through a boss 29 which is externally finished for a union connection with a conduit not shown.

Assuming that liquid is introduced to the inlet passage 4 at 500 pounds pressure and that the valve 7 is in the closed position shown in Fig. 2, the fluid will find its way through a passage 31 in the piston 8 communicating with a chamber 32 formed by that portion of the bore 2 between the piston 8 and plug 3, thence through a port 33 communicating with an internally threaded bore 34 closed by a plug 36 at one end, and at the opposite end by a valve 37 normally kept in seated position as shown in Fig. 2 by a spring 38 interposed between said valve and the plug 36. The seat for valve 37 is threaded into the bore 34. Slidable in the bore 34 is a push pin 39 best shown in detail in Figs. 4 and 5.

This pin is formed of round rod material and fluted as indicated at 41 to permit passage of liquid from valve 37 through the upper end of bore 34. A reduced portion on the lower end of push pin 39 serves to depress valve 37 and a reduced portion 42 on the opposite end is provided with a ball 43 which engages a bore 44 in a lever 46.

This lever is provided with a hammer head 47 which is rounded at the ends for rocking engagement with the walls of chamber 11.

The end of the lever 46 remote from the head 47 extends through a slot 48 in the cylindrical wall of piston 7 as shown in Fig. 7 and through a slot 49 in plunger 14.

When these parts are assembled as shown in Fig. 2, the lever 46 is interlocked in piston 7 and plunger 14 in the position shown, but at the same time is capable of being moved vertically at one end by a movement of plunger 14. The upward movement of the lever 46 is limited by a finger or stop 51 which contacts with the upper wall of chamber 11.

The function of this stop 51 is to limit the upward movement of plunger 14 so that when plunger 18 is raised past the point where stop 51 encounters the wall of chamber 11 the lower end of plunger 18 withdraws from the needle valve 16, uncovering port 24, thus relieving pressure in chamber 11 through the passage 24, ports 27, groove 26 and passage 28.

When the plunger 18 is pressed downwardly it engages needle valve 16, closing passage 24, and depresses plunger 14. Liquid in the cavity formed between the end of plunger 14 and piston 8 is displaced through a passage 52 in said plunger to allow free movement of plunger 14.

As the plunger 14 descends it depresses the lever 46 which rocks on its fulcrum point indicated at 53, depressing push pin 39 and opening valve 37.

The opening of valve 37 (having a greater area than that of passage 31) reduces the pressure in chamber 32 through port 33, bore 34 and valve 37, allowing initial pressure to depress piston 8 and unseat valve 7, establishing direct communication between chamber 4 and discharge chamber 11.

When the pressure in chamber 11 reaches a point where it overbalances the force applied to piston 18 by spring 19, the piston 18 moves upwardly allowing plunger 14 and lever 46 to rise, at which time spring 38 lifts valve 37 and push pin 39 and the valve 37 will be closed, thereby closing communication between chambers 32 and 11.

At this time the pressures in chambers 32 and 4 are balanced by passage 31, and valve 7 is moved upwardly by spring 9 and the combined force of spring 9 and the liquid pressure in chamber 4 on valve 7 hold it on seat 6, cutting off the initial pressure.

At the next moment, if it were desired to reduce the pressure in chamber 11, this may be done by reducing the compression of spring 19, thereby allowing pressure in chamber 11 to raise plunger 18 unseating needle valve at 16, at which time pressure will be relieved through passages 24 and 28, until the pressure in chamber 11 and the pressure exerted by spring 19 equalize, at which time plunger 18 will re-engage needle valve 16 which will be seated, preventing further reduction from chamber 11.

All pressure may be exhausted from chamber 11 by relieving all tension on spring 19.

Thus it is obvious that any part of the initial pressure may be automatically admitted, maintained or reduced in chamber 11, the amount of pressure being determined by the compression applied to spring 19.

As a means for manually applying compression to said spring 19, for this purpose I provide the following structure;

A pin 55 is secured to the wall of sleeve 23 and extends through a cam slot 54 in the sleeve 22.

By this means, if the sleeve 22 is rotated with respect to the sleeve 23 (which is fixed), the cam slot 54 and pin 53 will act to draw the sleeve 22 downwardly and thus compress spring 19, and vice versa.

I provide a lever 56 secured as by screws 57 to the sleeve 22 to manually compress the spring 19 for the purposes stated.

At 58 I show a spring adapted to support the weight of plunger 18 and spring 19.

Having thus described my invention, what I claim as new, and desire to secure by Letters Patent of the United States, is;—

1. A pressure regulator comprising, inlet and discharge chambers, said chambers connected by a passage, a main valve adapted to control said passage, said valve mounted on and moved by a piston, an auxiliary valve adapted to control a channel from the discharge to a space behind said piston, a subsidiary valve mounted in the piston and adapted to control a waste from the discharge, said subsidiary valve adapted by its movement to operate said auxiliary valve.

2. A pressure regulator, comprising, inlet and discharge chambers, said chambers connected by a passage, a main valve adapted to control said passage, said main valve mounted on and moved by a piston, an auxiliary valve adapted to control a channel from the discharge to a space behind said piston, a subsidiary valve mounted in said piston, and adapted to control waste from the discharge, a lever connecting said auxiliary and subsidiary valves, said lever oscillated by the movement of said subsidiary valve and adapted by such oscillation to operate said auxiliary valve.

3. A pressure regulator comprising inlet and discharge chambers, said chambers connected by a passage, a main valve adapted to control said passage, said main valve mounted on and moved by a piston, said discharge chamber provided with a waste passage, a subsidiary valve controlling said waste, the seat of said valve being movable to open and close said valve and waste, a spring to oppose said opening movement of said seat and hand operated means for adjusting the tension of said spring.

In testimony whereof I affix my signature.

JOY S. REYNOLDS.